US012036796B2

(12) United States Patent
Takenaga et al.

(10) Patent No.: US 12,036,796 B2
(45) Date of Patent: Jul. 16, 2024

(54) LIQUID DISCHARGE APPARATUS AND WASTE LIQUID TANK

(71) Applicant: CANON KABUSHIKI KAISHA, Tokyo (JP)

(72) Inventors: Ken Takenaga, Kanagawa (JP); Koya Iwakura, Kanagawa (JP); Hideaki Matsumura, Kanagawa (JP); Tetsu Hamano, Tokyo (JP); Nobuhiro Toki, Kanagawa (JP); Daiju Takeda, Kanagawa (JP); Fumie Kameyama, Tokyo (JP); Koki Shimada, Kanagawa (JP); Shota Asada, Tokyo (JP); Yusuke Tanaka, Kanagawa (JP); Yuta Araki, Chiba (JP); Taiji Maruyama, Kanagawa (JP); Atsushi Matsuyama, Kanagawa (JP); Yusuke Naratani, Tokyo (JP); Kousuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/491,411

(22) Filed: Sep. 30, 2021

(65) Prior Publication Data

US 2022/0111656 A1 Apr. 14, 2022

(30) Foreign Application Priority Data

Oct. 9, 2020 (JP) ................................ 2020-171416

(51) Int. Cl.
*B41J 2/17* (2006.01)
*B41J 2/135* (2006.01)

(52) U.S. Cl.
CPC ............ *B41J 2/1721* (2013.01); *B41J 2/135* (2013.01); *B41J 2002/1728* (2013.01)

(58) Field of Classification Search
None
See application file for complete search history.

(56) References Cited

U.S. PATENT DOCUMENTS 5,506,611 A * 4/1996 Ujita .................. B41J 2/17553 347/19
6,252,615 B1 6/2001 Yoshino .................. B41J 2/165
(Continued)

FOREIGN PATENT DOCUMENTS

CN 1390171 1/2003
CN 1470389 1/2004
(Continued)

OTHER PUBLICATIONS

Office Action dated Mar. 3, 2023 in counterpart Chinese Application No. 202111150890.0, together with English translation thereof.
(Continued)

*Primary Examiner* — Alejandro Valencia
(74) *Attorney, Agent, or Firm* — Venable LLP

(57) ABSTRACT

A liquid discharge apparatus includes a discharging unit configured to be capable of discharging a plurality of kinds of liquids onto a medium, and a waste liquid tank including a storage part configured to store a waste liquid of the liquid. The waste liquid tank includes a first inflow port and a second inflow port from which the waste liquid flows into the storage part, and a restriction portion located between the first inflow port and the second inflow port, and configured to restrict movement of the waste liquid in the storage part.

12 Claims, 5 Drawing Sheets

(56) References Cited

U.S. PATENT DOCUMENTS

| | | | | |
|---|---|---|---|---|
| 6,402,293 | B1 | 6/2002 | Sawicki | B41J 2/165 |
| 6,623,099 | B2 | 9/2003 | Matsumura | 347/35 |
| 7,316,467 | B2 | 1/2008 | Toki | 347/36 |
| 7,396,105 | B2 | 7/2008 | Toki et al. | 347/35 |
| 7,556,342 | B2 | 7/2009 | Hamano | 347/33 |
| 7,926,905 | B2 | 4/2011 | Toki et al. | 347/35 |
| 2002/0109749 | A1 | 8/2002 | Matsumura | B41J 2/165 |
| 2002/0171706 | A1 | 11/2002 | Miyamoto et al. | B41J 2/165 |
| 2003/0020782 | A1 | 1/2003 | Neal et al. | 347/35 |
| 2003/0234832 | A1 | 12/2003 | Uchida | B41J 2/18 |
| 2006/0214981 | A1 | 9/2006 | Fukasawa et al. | B41J 2/165 |
| 2008/0158294 | A1* | 7/2008 | Katoh | B41J 2/1721<br>347/36 |
| 2008/0297575 | A1 | 12/2008 | Asaki et al. | B41J 2/175 |
| 2012/0194611 | A1* | 8/2012 | Nishida | B41J 2/16523<br>347/36 |
| 2012/0218345 | A1 | 8/2012 | Osumi et al. | B41J 2/165 |
| 2012/0234436 | A1 | 9/2012 | Harada et al. | 141/383 |
| 2012/0236074 | A1 | 9/2012 | Harada et al. | 347/36 |
| 2018/0326734 | A1 | 11/2018 | Balala et al. | B41J 2/17 |
| 2018/0326740 | A1 | 11/2018 | Baterna et al. | B41J 2/185 |
| 2020/0086649 | A1 | 3/2020 | Tojo | B41J 2/17 |
| 2020/0247128 | A1 | 8/2020 | Tanaka | B41J 2/16547 |
| 2020/0316951 | A1 | 10/2020 | Narazaki et al. | B41J 2/16532 |

FOREIGN PATENT DOCUMENTS

| | | |
|---|---|---|
| CN | 1861402 | 11/2006 |
| CN | 1931588 | 3/2007 |
| CN | 1958294 | 5/2007 |
| CN | 101213083 | 7/2008 |
| CN | 101318408 | 12/2008 |
| CN | 110621507 | 12/2019 |
| CN | 110901232 | 3/2020 |
| JP | 2001-088324 | 4/2001 |
| JP | 2005-104089 | 4/2005 |
| JP | 2007-144656 | 6/2007 |
| JP | 2009-234224 | 10/2009 |
| JP | 2012-196803 | 10/2012 |
| KR | 10-2007-0099202 | 10/2007 |

OTHER PUBLICATIONS

Office Action dated May 13, 2024 in counterpart Japanese Application No. 2020-171416, together with English translation thereof.

* cited by examiner

LIQUID DISCHARGE APPARATUS AND WASTE LIQUID TANK

BACKGROUND OF THE INVENTION

Field of the Invention

The present invention relates to a liquid discharge apparatus and a waste liquid tank.

Description of the Related Art

As a liquid discharge apparatus such as an inkjet printing apparatus, there is known a liquid discharge apparatus including a waste liquid tank for storing a waste liquid. In a case of the inkjet printing apparatus, the waste ink generated in a recovery operation of a printhead or the like is stored in the waste liquid tank (Japanese Patent Laid-Open No. 2012-196803 or the like).

Some kinds of pigment inks and dye inks have the property of sticking and depositing when mixed with each other. If such a plurality of kinds of waste inks are mixed in the waste liquid tank, sticking or depositing occurs in the waste liquid tank. If sticking or depositing occurs near an inflow port of the waste liquid, the waste ink does not diffuse widely in the waste liquid tank. This decreases the waste ink storage capacity, and the lifetime of the waste liquid tank is shortened.

SUMMARY OF THE INVENTION

The present invention provides a technique of suppressing mixing of different kinds of liquids near the inflow port of a waste liquid tank.

According to an aspect of the present invention, there is provided a liquid discharge apparatus comprising a discharging unit configured to be capable of discharging a liquid onto a medium, and a waste liquid tank including a storage part configured to store a waste liquid of the liquid from the discharging unit, wherein the waste liquid tank comprises a first inflow port from which the waste liquid flows into the storage part, a second inflow port, being different from the first inflow port, from which the waste liquid flows into the storage part, and a restriction portion located between the first inflow port and the second inflow port, and configured to restrict movement of the waste liquid in the storage part.

Further features of the present invention will become apparent from the following description of exemplary embodiments (with reference to the attached drawings).

DESCRIPTION OF THE EMBODIMENTS

Figure 1:
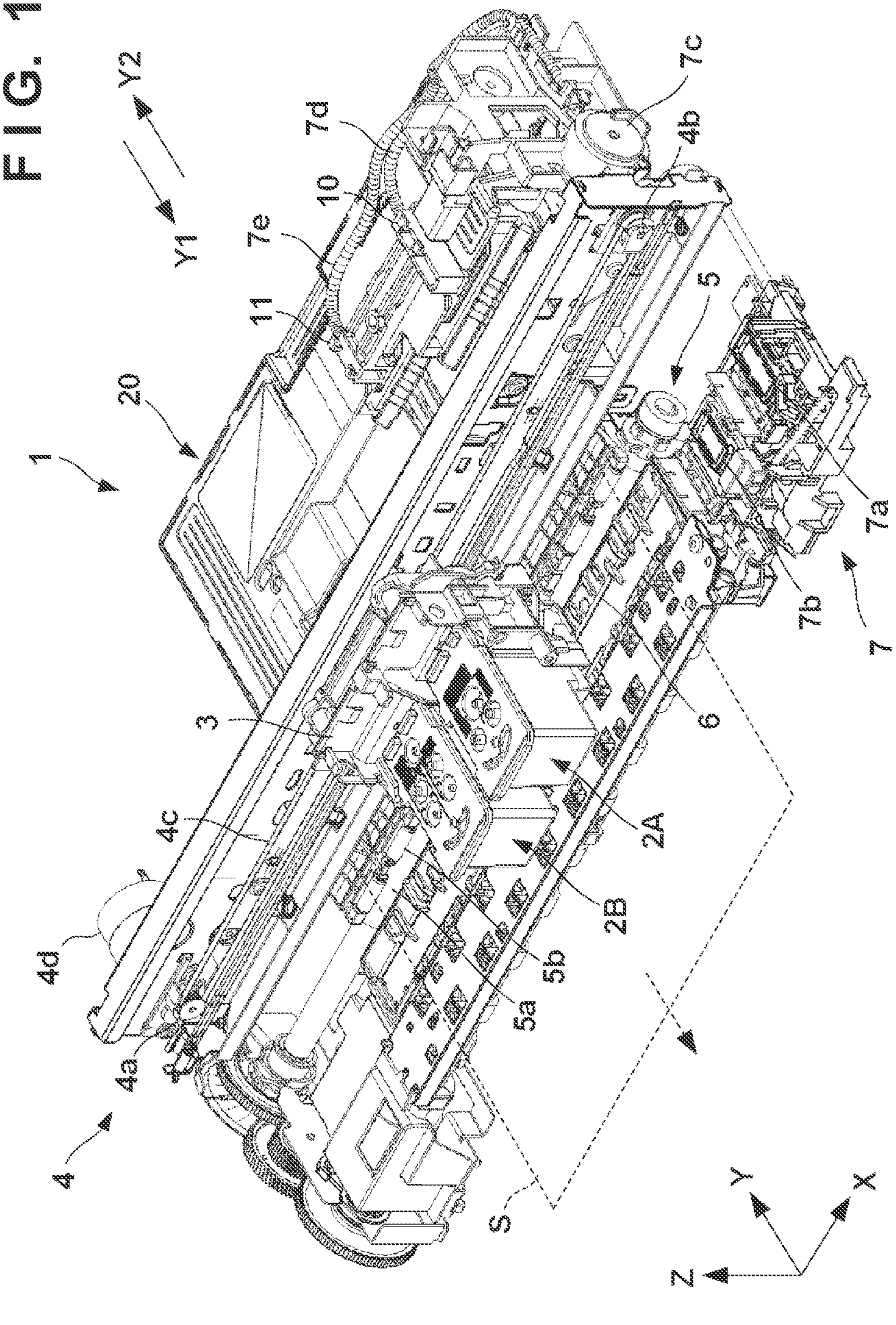
FIG. 1 is a schematic view showing a liquid discharge apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Outline of Liquid Discharge Apparatus>

FIG. 1 is a schematic view showing a liquid discharge apparatus 1 according to an embodiment of the present invention. The liquid discharge apparatus 1 according to this embodiment is an inkjet printing apparatus that performs printing on a print medium by discharging ink as a liquid, but the present invention is also applicable to various types of liquid discharge apparatuses other than the inkjet printing apparatus. In the drawings, arrows X and Y indicate horizontal directions orthogonal to each other, and an arrow Z indicates a vertical direction (direction of gravity). The X direction is the widthwise direction (left-and-right direction) of the liquid discharge apparatus 1. The Y direction is the depth direction of the liquid discharge apparatus 1.

Note that “printing” includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a “print medium”, cloth, a plastic film, and the like may be used as print media.

The liquid discharge apparatus 1 includes printheads 2A and 2B that can discharge ink. Each of the printheads 2A and 2B discharges ink onto a sheet S, thereby printing an image on the sheet S. Each of the printheads 2A and 2B includes an ink discharge surface formed with a plurality of nozzles which discharge ink, and the ink discharge surface faces a platen 6 that supports the sheet S. Each nozzle is provided with, for example, an electrothermal transducer (heater). The electrothermal transducer bubbles ink by energizing and heating it, and discharges the ink by the bubbling energy. The printheads 2A and 2B discharge different kinds of inks. In this embodiment, the printhead 2A discharges a pigment ink, and the printhead 2B discharges a dye ink. Further, the printhead 2B discharges a plurality of kinds (for example, a plurality of colors) of inks. The ink is supplied to each of the printheads 2A and 2B from an ink tank (not shown). Note that the printheads 2A and 2B using piezoelectric devices can also be employed. Further, each of the printheads 2A and 2B may be a head cartridge integrated with an ink tank storing the ink. Furthermore, each of the printheads 2A and 2B may be a line head in which discharge ports are arranged in a region corresponding to the width of the sheet S.

The printheads 2A and 2B are mounted on a carriage 3. The carriage 3 is reciprocated in the X direction (main scanning direction) by a driving unit 4. The driving unit 4 includes pulleys 4*a* and 4*b* arranged spacing apart from each other in the X direction, an endless belt 4*c* wounded between the pulleys 4*a* and 4*b*, and a carriage motor 4*d* serving as a driving source for rotating the pulley 4*a*. The carriage 3 is connected to the endless belt 4*c* and moves in the X direction along with traveling of the endless belt 4*c*. By discharging the ink from each of the printheads 2A and 2B onto the sheet S in the process of movement of the carriage 3, an image is printed. This operation is referred to as a print scan.

A conveying unit 5 is a mechanism for conveying the sheet S in the Y direction (sub-scanning direction). The conveying unit 5 includes a conveying roller 5*a*, a pinch roller 5*b* pressed against the conveying roller 5*a*, and a conveying motor (not shown) serving as a driving source for rotating the conveying roller 5*a*. The sheet S is nipped in a nip portion between the conveying roller 5*a* and the pinch roller 5*b*, and conveyed in the direction indicated by a dashed arrow by rotation of the conveying roller 5*a*. The conveying unit 5 intermittently conveys the sheet S such that the sheet S passes between the platen 6 and the printheads 2A and 2B. By alternately repeating the conveying operation of the sheet S by the conveying unit 5 and a print scan, an image for each page can be printed on the sheet S.

A recovery unit 7 is provided in one end of the moving range of the carriage 3. The recovery unit 7 is a mechanism for performing a recovery operation of the ink discharge performance of each of the printheads 2A and 2B. The recovery unit 7 includes a cap 7*a* that covers the ink discharge surface of the printhead 2A, and a cap 7*b* that covers the ink discharge surface of the printhead 2B. The caps 7*a* and 7*b* can prevent drying of the ink discharge surfaces of the corresponding printheads 2A and 2B. The recovery unit 7 further includes a suction pump 7*c*. The suction pump 7*c* can perform the recovery operation of sucking the ink from the printheads 2A and 2B via the caps 7*a* and 7*b*. Due to the heat generated by repeating ink discharges, bubbles are generated in the ink in each of the printheads 2A and 2B, and this causes a discharge failure. By the recovery operation, it is possible to remove such bubbles and remove highly viscous ink or the like existing in the ink discharge surface.

The ink sucked from the printheads 2A and 2B becomes a waste liquid (waste ink) that will not be used in the subsequent printing. The suction pump 7*c* drains the ink sucked from the printheads 2A and 2B to a waste liquid tank 20. The waste ink from the suction pump 7*c* is introduced into the waste liquid tank 20 via tubes 7*d* and 7*e* and introducing members 10 and 11. The tube 7*d* and the introducing member 10 correspond to the printhead 2A, and the pigment ink flows therethrough. The tube 7*e* and the introducing member 11 correspond to the printhead 2B, and the dye ink flows therethrough.

The waste liquid tank 20 is a container for storing and holding the waste ink. The liquid discharge apparatus 1 includes an attachment portion (not shown) to which the waste liquid tank 20 is detachably attached. In this embodiment, the waste liquid tank 20 can be attached to and detached from the liquid discharge apparatus 1 by moving the waste liquid tank 20 in the Y direction. An arrow Y1 indicates an attachment direction, and an arrow Y2 indicates a detachment direction.

Figure 2:
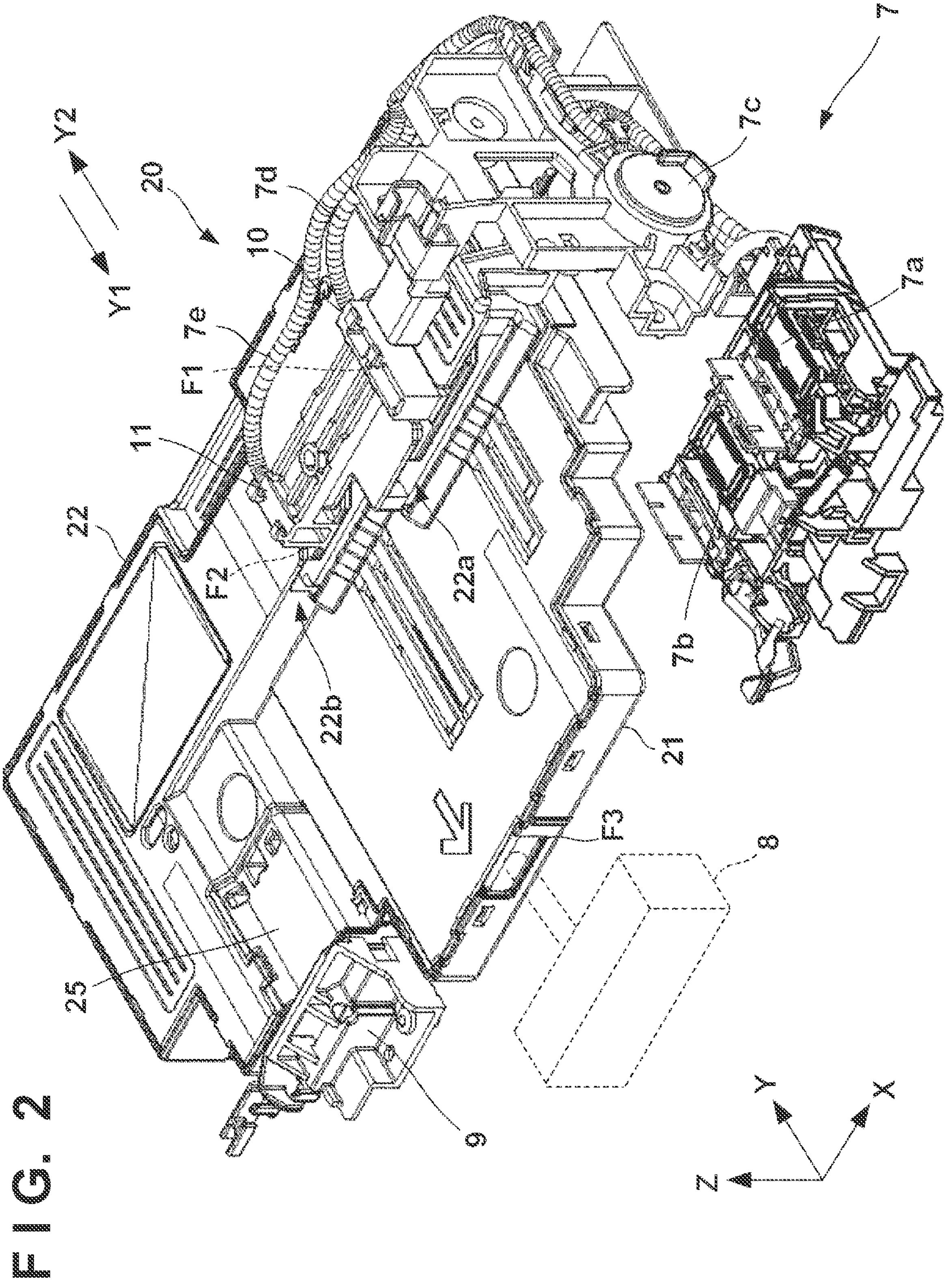
FIG. 2 is a perspective view showing a waste liquid tank and the arrangement in the periphery thereof in an attached state.

Refer to FIG. 2 in addition to FIG. 1. FIG. 2 is a perspective view showing the waste liquid tank 20 and the arrangement in the periphery thereof in an attached state. A collection unit 8 also drains the waste ink to the waste liquid tank 20. The collection unit 8 is a unit that collects the waste ink discharged from the printhead 2B to the platen 6 and discharged to the outside of the sheet and drains it to the waste liquid tank 20.

More specifically, in a case of so-called marginless printing in which no margin is left in the edge of the sheet S, the ink is also discharged from the printhead 2B to the range outside the edge of the sheet S. A groove for accepting such an ink which does not land on the sheet S is formed in the platen 6, and the collection unit 8 introduces the waste ink accepted by the groove to the waste liquid tank 20. Further, ink not related to printing may be discharged to the groove of the platen 6 to maintain the discharge performance of the printhead 2B.

The collection unit 8 may be a member that forms a flow passage of the waste ink from the groove of the platen 6 to the waste liquid tank 20, or a driving mechanism such as a pump that pumps the waste ink may be provided in addition to the flow passage. Note that in this embodiment, for marginless printing, an image is printed using only the printhead 2B that discharges the dye ink without using the pigment ink. The ink discharged to the groove of the platen 6 to maintain the discharge performance is also the dye ink alone.

The introducing members 10 and 11 are immovable members supported by a frame (not shown) of the liquid discharge apparatus 1. The introducing members 10 and 11 are attached to the waste liquid tank 20 in accordance with an attachment operation of the waste liquid tank 20 to the liquid discharge apparatus 1 by a user, and separated from the waste liquid tank 20 in accordance with a detachment operation of the waste liquid tank 20. The introducing members 10 and 11 form introducing ports for downwardly draining the waste ink flowing from the tubes 7*d* and 7*e*, respectively, and introducing it to the waste liquid tank 20.

The liquid discharge apparatus 1 is provided with a connection terminal 9. The connection terminal 9 includes an electrical contact that electrically connects a control unit (not shown) of the liquid discharge apparatus 1 and the waste liquid tank 20. The waste liquid tank 20 is provided with an electric circuit 25. The electric circuit 25 includes a connection terminal which is connected to the connection terminal 9, and a storage device such as a ROM. The control unit (not shown) of the liquid discharge apparatus 1 can manage the amount of waste ink held in the waste liquid tank 20 by calculating the amount of waste ink drained to the waste liquid tank 20, writing it in the storage device, and updating it. If the amount of waste ink held in the waste liquid tank 20 exceeds a predetermined amount, the user is notified of replacement of the waste liquid tank 20. The user removes the waste liquid tank 20 filled with the waste ink, and attaches the new waste liquid tank 20.

<Waste Liquid Tank>

Figure 3B:
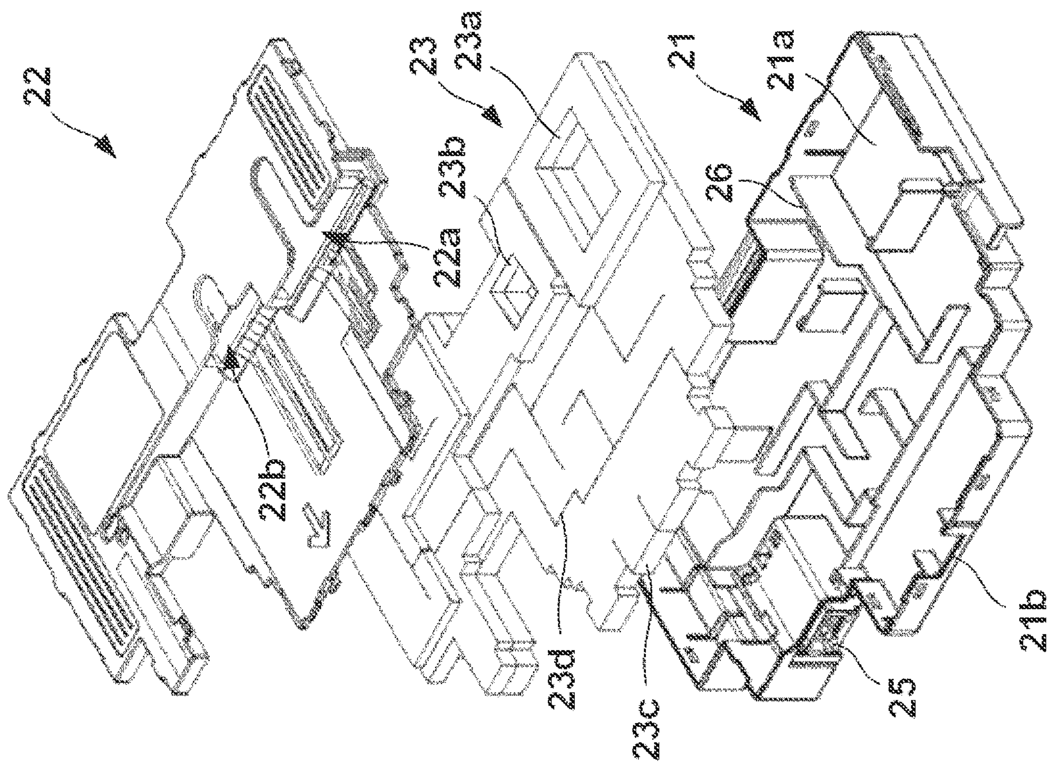
FIG. 3B is an exploded perspective view of the waste liquid tank.
Figure 3A:
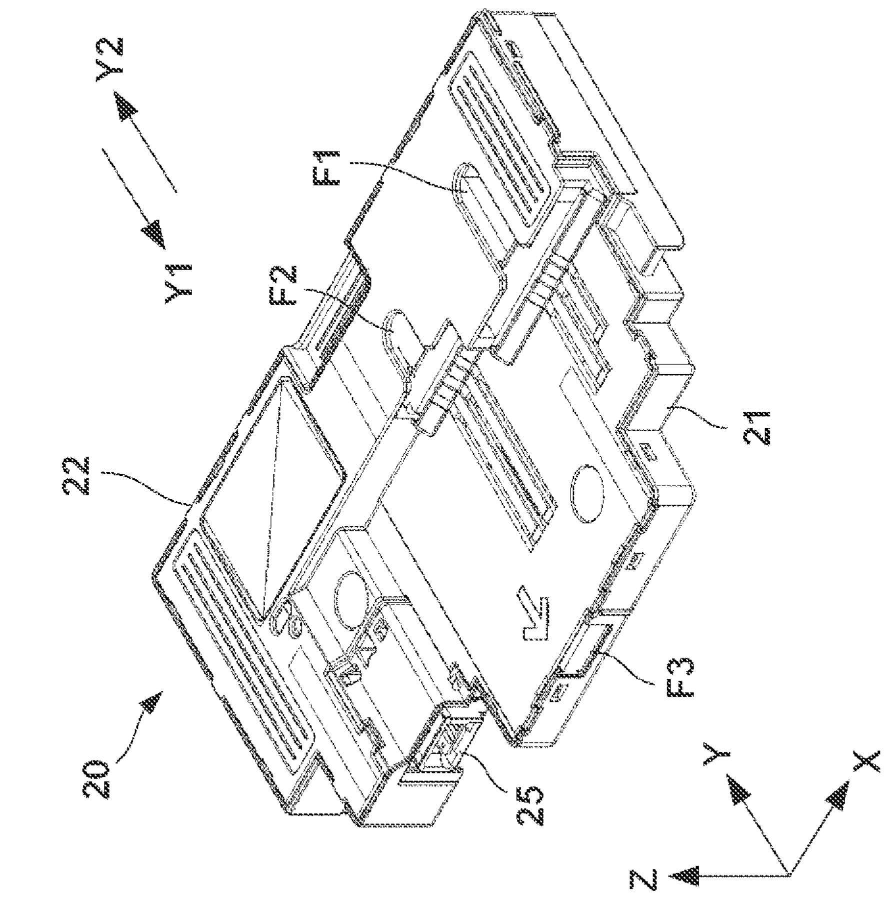
FIG. 3A is a perspective view of the waste liquid tank.

With reference to FIGS. 3A and 3B, the structure of the waste liquid tank 20 will be described. FIG. 3A is a perspective view of the waste liquid tank 20, and FIG. 3B is an exploded perspective view of the waste liquid tank 20. The waste liquid tank 20 is a hollow body including a box-shaped main body 21 with an open top, and a cover 22 covering the top of the main body 22. An absorbent member 23 that absorbs the waste ink is stored in a storage part (storage space) inside the waste liquid tank 20. By absorbing the fluid waste ink by the absorbent member 23, leakage of the waste ink can be prevented even if the waste liquid tank 20 or the liquid discharge apparatus 1 is inclined.

The electric circuit 25 is provided in the main body 21. An opening portion 21*b* is formed in the end portion of the main body 21 on the front side in the Y1 direction. The opening portion 21*b* forms an inflow port F3 to which the waste ink is introduced from the collection unit 8. Further, a partition wall 26, which forms the flow passage of the waste ink by partitioning the storage part inside the waste liquid tank 20, is formed in the main body 21. In this embodiment, the partition wall 26 is a plate-like wall portion standing from a plate-like bottom portion 21*a* of the main body 21, and formed integrally with the main body 21.

The absorbent member 23 includes accepting portions 23*a* and 23*b* each of which is an opening space extending in the thickness direction of the absorbent member 23. The accepting portions 23*a* and 23*b* according to this embodiment are rectangular parallelepiped-shape spaces. The accepting portion 23*a* is located immediately below the introducing member 10. The waste ink (pigment ink) flowing down from the introducing port of the introducing member 10 first flows into the accepting portion 23*a*, and is absorbed by the absorbent member 23. The accepting portion 23*b* located immediately below the introducing member 11. The waste ink (dye ink) flowing down from the introducing port of the introducing member 11 first flows into the accepting portion 23*b*, and is absorbed by the absorbent member 23. A side portion 23*c* of the absorbent member 23 on the front side in the Y1 direction is located in the opening portion 21*b*, and the waste ink (pigment ink) from the collection unit 8 flows in and penetrates there. A plurality of slits 23*d* extending in the thickness direction of the absorbent member 23 are formed in the absorbent member 23. The partition wall 26 is inserted into the slits 23*d*, so that the absorbent member 23 is more reliably held by the main body 21.

The cover 22 includes slots 22*a* and 22*b* open to the front side in the Y1 direction. The interiors of the slots 22*a* and 22*b* are open downward and communicate with the accepting portions 23*a* and 23*b*, respectively. The introducing member 10 is attached to the slot 22*a*, and the introducing member 11 is attached to the slot 22*b*.

With the arrangement described above, inflow ports F1 to F3, into which the waste ink flows, are formed in the waste liquid tank 20. The inflow port F1 is formed by the slot 22*a*, and the inflow port F2 is formed by the slot 22*b*. The inflow port F3 is formed by the opening portion 21*b*.

Here, some kinds of pigment inks and dye inks have the property of sticking and depositing when mixed with each other. If such a plurality of kinds of waste liquids are mixed in the waste liquid tank 20, sticking or depositing occurs in the waste liquid tank 20. This decreases the waste ink storage capacity, and the lifetime of the waste liquid tank 20 is shortened.

Figure 4:
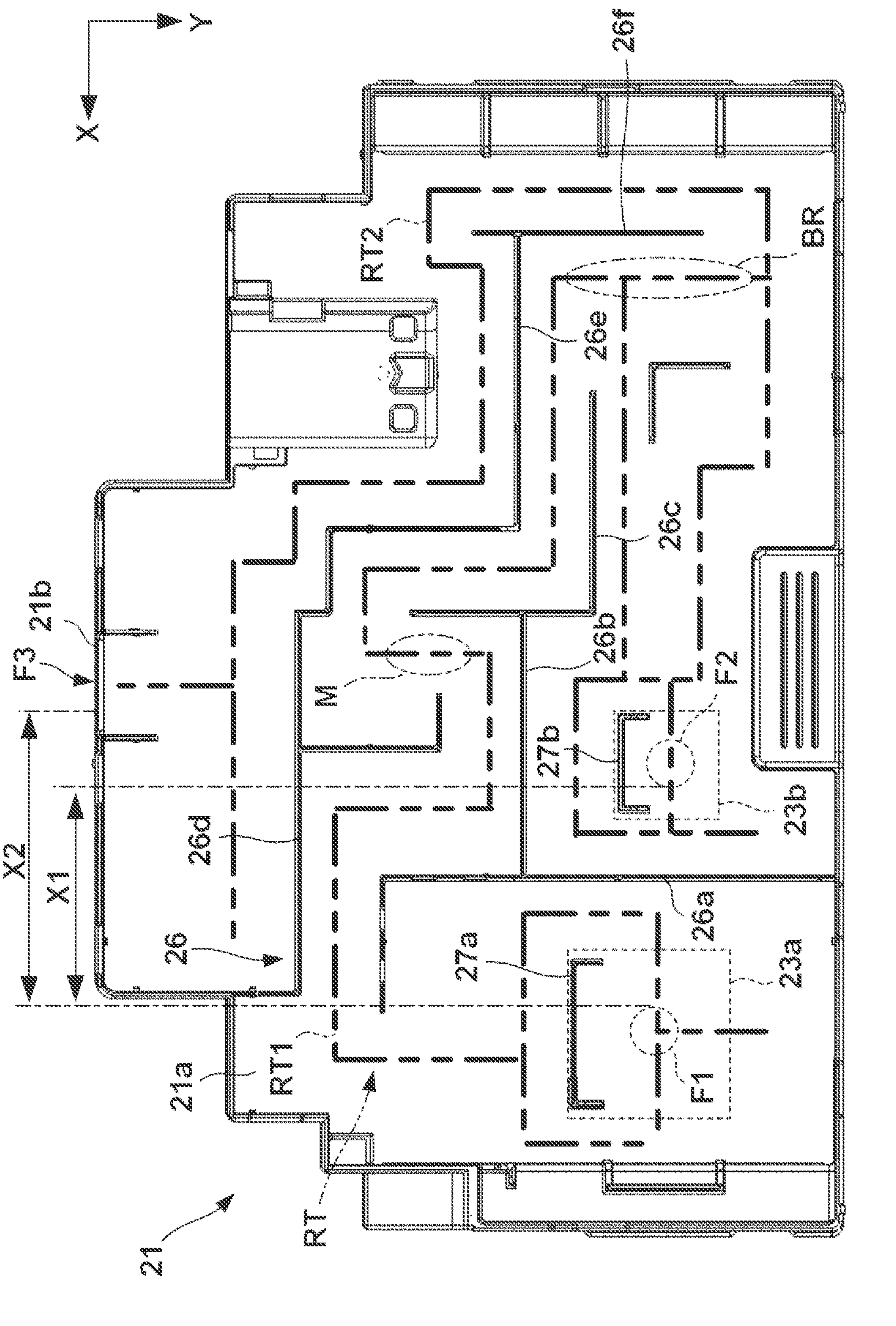
FIG. 4 is a view for explaining the internal structure of the waste liquid tank.

In this embodiment, the pigment ink flows into the inflow port F1, and the dye ink flows into the inflow ports F2 and F3. By distinguishing between the inflow port for the pigment ink and the inflow port for the dye ink, it is possible to prevent these inks from being mixed early. Further, the interior of the waste liquid tank 20 has a flow passage structure formed by the partition wall 26 such that the pigment ink and the dye ink are not mixed early. FIG. 4 is a view for explaining the internal structure of the waste liquid tank 20, which is a plan view of the main body 21.

The partition wall 26 includes a plurality of wall portions each serving as a restriction portion that restricts the movement of the waste liquid. More specifically, the partition wall 26 includes a wall portion 26*a* extending in the Y direction. The wall portion 26*a* is located between the inflow port F1 and the inflow port F2. More specifically, the wall portion 26*a* extends in a direction crossing a virtual line connecting the inflow port F1 and the inflow port F2. Accordingly, the pigment ink flowing in from the inflow port F1 is restricted to linearly move to the inflow port F2 in the shortest distance. Similarly, the dye ink flowing in from the inflow port F2 is restricted to linearly move to the inflow port F1 in the shortest distance. Therefore, it is possible to suppress mixing of the pigment ink and the dye ink near the inflow ports F1 and F2.

The partition wall 26 also includes a wall portion 26*d* extending in the X direction. The wall portion 26*d* is located between the inflow port F1 and the inflow port F3. More specifically, the wall portion 26*d* extends in a direction crossing a virtual line connecting the inflow port F1 and the inflow port F3. Accordingly, the pigment ink flowing in from the inflow port F1 is restricted to linearly move to the inflow port F3 in the shortest distance. Similarly, the dye ink flowing in from the inflow port F3 is restricted to linearly move to the inflow port F1 in the shortest distance. Therefore, it is also possible to suppress mixing of the pigment ink and the dye ink near the inflow ports F1 and F3.

A flow passage RT of the waste ink is formed inside the waste liquid tank 20 by the partition wall 26. The flow passage RT allows the inflow ports F1 to F3 to communicate with each other, but it bends a plurality of times in the middle and has a maze shape that bypasses the flow of the waste ink. Therefore, it is possible to suppress early mixing of the pigment ink and the dye ink.

The flow passage RT branches into three portions to the inflow ports F1 to F3 in a branch point BR. The flow passage connecting the inflow port F1, the branch point BR, and the inflow port F2 is referred to as a flow passage RT1. The flow passage RT1 is a passage formed between the wall portion 26*a* and the outer peripheral wall of the main body 21, and between wall portions 26*b* and 26*c* and wall portions 26*d* and 26*e*. The inflow port F1 and the inflow port F2 are located in one end portion and the other end portion, respectively, of the flow passage RT1, and the intermediary portion of the flow passage RT1 is a portion M. Although influenced by the total inflow amount, the pigment ink having flowed into the inflow port F1 and the dye ink having flowed into the inflow port F2 are generally mixed near the portion M. Since the area near the portion M is far from each of the inflow ports F1 and F2, the inflow of the waste ink is not hindered even if sticking or the like of the waste ink occurs. Thus, the storage capacity of the waste liquid tank 20 is not decreased.

The flow passage connecting the inflow port F1, the branch point BR, and the inflow port F3 is referred to as a flow passage RT2. The flow passage RT2 is a passage formed between the wall portion 26*a* and the outer peripheral wall of the main body 21, between the wall portions 26*b* and 26*c* and the wall portions 26*d* and 26*e*, between a wall portion 26*f* and the outer peripheral wall of the main body 21, and between the wall portions 26*d* and 26*e* and the outer peripheral wall of the main body 21. That is, a part of the flow passage RT2 is a common flow passage with a part of the flow passage RT1. The inflow port F1 and the inflow port F3 are located in one end portion and the other end portion, respectively, of the flow passage RT2. Also in the flow passage RT2, since the inflow port F1 and the inflow port F3 are away from each other, early mixing of the pigment ink from the inflow port F1 and the dye ink from the inflow port F3 is prevented.

In this embodiment, in terms of the distance of the flow passage RT, the inflow port F3 is closer to the inflow port F2 than the inflow port F1. The dye ink flows into each of the inflow ports F2 and F3. Even if the inflow ports F2 and F3 are located close to each other, only the dye inks are mixed with each other, so sticking or depositing of the ink does not occur. Therefore, with the arrangement as described above, it can be avoided that the pigment ink and the dye ink are mixed early and sticking or depositing of the ink occurs.

Note that a wall body similar to the partition wall 26 may be used to divide the interior of the waste liquid tank 20 into two spaces including a storage part for the pigment ink and a storage part for the dye ink. However, the consumption amount of the pigment ink and the consumption amount of the dye ink vary depending on the manner of use by the user. If the interior of the waste liquid tank 20 is divided into two spaces including the storage part for the pigment ink and the storage part for the dye ink, for example, when the consumption amount of the pigment ink is small, the time to replace the waste liquid tank 20 comes while the storage part for the pigment ink remains. To the contrary, according to the arrangement of this embodiment, regardless of the ratio of the consumption amount of the pigment ink and the consumption amount of the dye ink, it is possible to reach the replacement time with the waste liquid tank 20 filled with the waste ink.

Diffusion walls 27*a* and 27*b* are provided in the middle of the flow passage RT. Each of the diffusion walls 27*a* and 27*b* diffuses the flow of the waste ink, thereby preventing the waste ink from being unevenly stored in the storage part of the waste liquid tank 20. Each of the diffusion wall 27*a* and 27*b* is a plate-like wall portion standing from the bottom portion 21*a* of the main body 21 similar to the partition wall 26, and formed integrally with the main body 21. The diffusion wall 27*a* is arranged adjacent to the inflow port F1, and extends in a direction (X direction here) crossing the flow passage RT. The diffusion wall 27*a* diffuses the waste ink in the X direction by restricting the Y-direction movement of the waste ink immediately after flowing in. The diffusion wall 27*b* is arranged adjacent to the inflow port F2, and extends in the X direction so as to diffuse, in the X direction, the waste ink immediately after flowing in.

The inflow port F1 and the inflow ports F2 and F3 are spaced apart from each other in a direction (X direction here) crossing the attachment/detachment direction (Y direction) of the waste liquid tank 20. More specifically, the inflow port F1 and the inflow port F2 are spaced apart from each other in the X direction by a distance X1. Further, the inflow port F1 and the inflow port F3 are spaced apart from each other in the X direction by a distance X2. With such an arrangement, during the attachment/detachment operation of the waste liquid tank 20, it can be avoided that the pigment ink near the inflow port F1 and the introducing member 10 mixes with the dye ink near the inflow ports F2 and F3, the introducing member 11, and the exit of the collection unit 8.

Second Embodiment

Figure 5A:
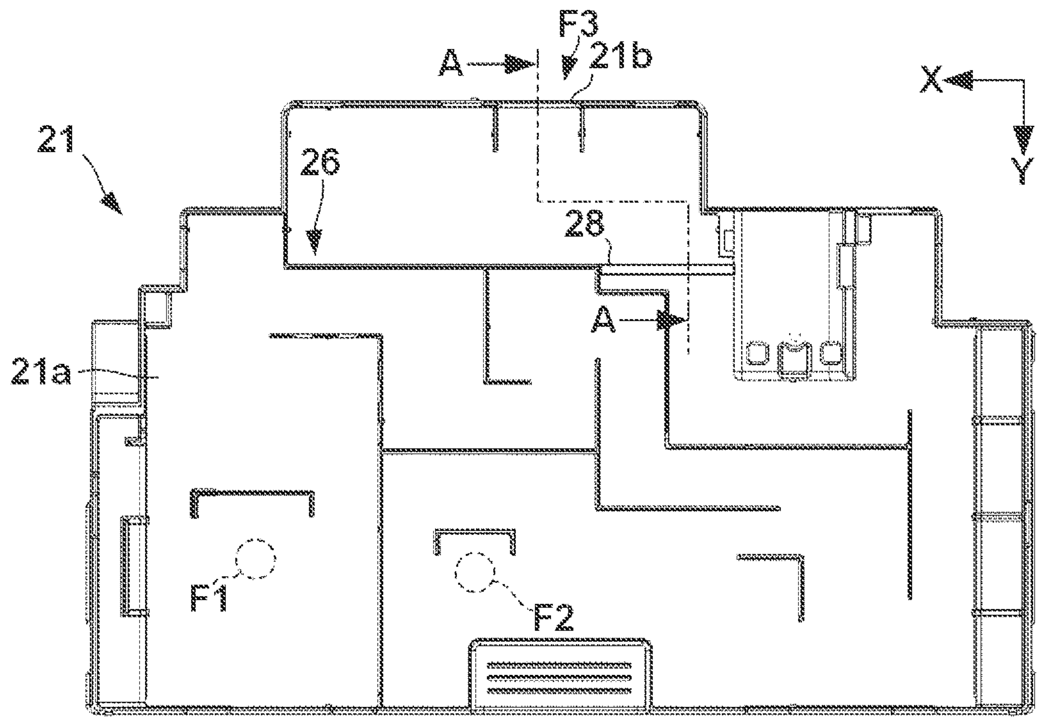
FIG. 5A is a view for explaining the internal structure of a waste liquid tank according to another embodiment.
Figure 5B:
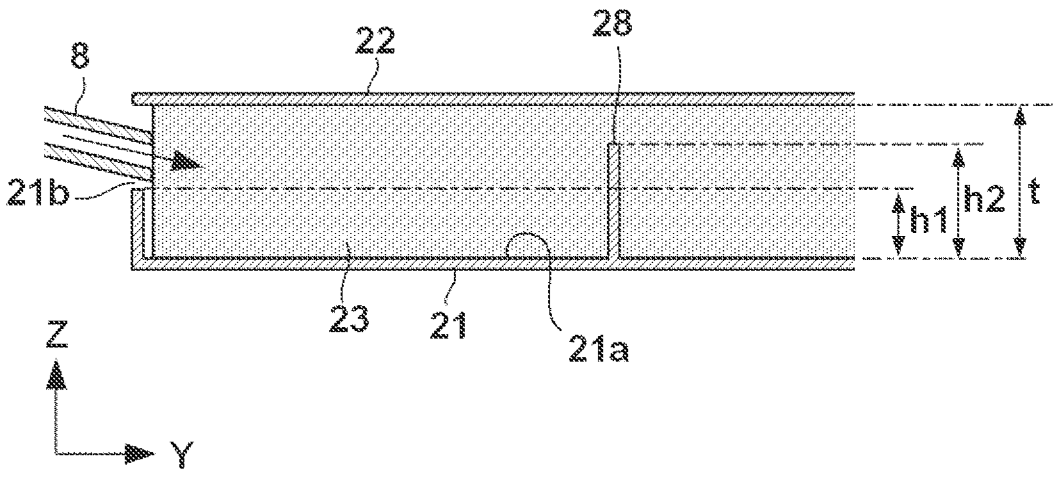
FIG. 5B is a sectional view taken along a line A-A in FIG. 5A.

If the recovery unit 7 performs a more powerful recovery operation, a large amount of the dye ink may flow into the inflow port F2. In such a case, the dye ink may reach the opening portion 21*b* and leak before sufficiently permeating and diffusing in the absorbent member 23. To prevent this, a wall portion that crosses the flow passage RT may be provided midway along the flow passage RT from the inflow port F2 to the inflow port F3. FIG. 5A is a plan view of a main body 21 according to this embodiment, and FIG. 5B is a sectional view taken along a line A-A in FIG. 5A.

A wall portion 28 is a wall portion crossing a flow passage RT in the X direction, and a plate-like wall portion standing from a bottom portion 21*a* of the main body 21 similar to a partition wall 26. A slit 23*d* of an absorbent member 23 includes a portion where the wall portion 28 is to be inserted, and the wall portion 28 is inserted into the absorbent member 23 in the thickness direction (Z direction here). The wall portion 28 is a low wall portion whose height h2 from the bottom portion 21*a* is smaller than a thickness t of the absorbent member 23. The height h2 is larger than a height h1 of an opening portion 21*b*.

The wall portion 28 restricts the Y-direction movement of the waste ink flowing at a low position in the flow passage RT (a position close to the bottom portion 21*a*). Accordingly, diffusion of the waste ink in the flow passage RT is promoted. On the other hand, the Y-direction movement of the waste ink flowing at a high position in the flow passage RT (a position close to a cover 22) is not restricted. Therefore, the wall portion 28 functions as a partial dam, and can prevent the dye ink flowing in from the inflow port F2 from reaching and leaking from an opening portion 21*b* before sufficiently permeating and diffusing in the absorbent member 23.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-171416, filed Oct. 9, 2020, which is hereby incorporated by reference herein in its entirety.

What is claimed is:

1. A liquid discharge apparatus comprising:

a discharging unit configured to discharge a liquid onto a medium;

a waste liquid tank configured to be detachably attached to the liquid discharge apparatus, and including: a storage part configured to store a waste liquid which is not discharged onto the medium by the discharging unit; a first inflow port from which the waste liquid flows into the storage part; a second inflow port from which the waste liquid flows into the storage part; a third inflow port from which the waste liquid flows into the storage part; and a partition wall which forms a flow passage of the waste liquid partitioning the storage part;

a first introducing member configured for detachable connection to the first inflow port by an attachment of the waste liquid tank to the liquid discharge apparatus so as to introduce the waste liquid into the first inflow port, and configured to be separated from the first inflow port by a detachment of the waste liquid tank from the liquid discharge apparatus;

a second introducing member configured for detachable connection to the second inflow port by the attachment of the waste liquid tank to the liquid discharge apparatus so as to introduce the waste liquid into the second inflow port, and configured to be separated from the second inflow port by the detachment of the waste liquid tank from the liquid discharge apparatus; and a third introducing member configured for detachable connection to the third inflow port by an attachment of the waste liquid tank to the liquid discharge apparatus so as to introduce the waste liquid into the third inflow port, and configured to be separated from the third inflow port by the detachment of the waste liquid tank from the liquid discharge apparatus, wherein a position of the third inflow port in the flow passage is closer to the second inflow port than the first inflow port.

2. The liquid discharge apparatus according to claim 1, wherein the first inflow port and the second inflow port are spaced apart from each other in a direction crossing an attachment/detachment direction of the waste liquid tank, the first introducing member and the second introducing member are spaced apart from each other in the direction crossing the attachment/detachment direction of the waste liquid tank, the first inflow port is a first slot which opens in the attachment/detachment direction, and the second inflow port is a second slot which opens in the attachment/detachment direction.

3. The liquid discharge apparatus according to claim 1, wherein the first inflow port is located in a first end portion of the flow passage, and the second inflow port is located in a second end portion of the flow passage.

4. The liquid discharge apparatus according to claim 1, wherein the flow passage is a flow passage bending in a middle.

5. The liquid discharge apparatus according to claim 1, wherein the waste liquid tank includes an absorbent member provided in the storage part and configured to absorb the waste liquid, and a low wall portion, which is inserted into the absorbent member in a thickness direction of the absorbent member and whose height is smaller than a thickness of the absorbent member in the thickness direction, is provided in the flow passage between the second inflow port and the third inflow port.

6. The liquid discharge apparatus according to claim 5, wherein the position of the third inflow port is a position where the waste liquid permeates a side portion of the absorbent member.

7. The liquid discharge apparatus according to claim 1, wherein a diffusion wall configured to diffuse a flow of the waste liquid is provided in the flow passage.

8. The liquid discharge apparatus according to claim 1, wherein the discharging unit is a printing unit configured to perform printing by discharging a first liquid and a second liquid which is a different kind of liquid from the first liquid, a waste liquid of the first liquid flows into the first inflow port through the first introducing member, and a waste liquid of the second liquid flows into the second inflow port through the second introducing member.

9. The liquid discharge apparatus according to claim 8, which further comprises a recovery unit configured to perform a recovery operation of a discharge performance of the printing unit, wherein the medium is a sheet, the first liquid is a pigment ink, the second liquid is a dye ink, a waste liquid of the pigment ink from the recovery unit flows into the first inflow port through the first introducing member, and a waste liquid of the dye ink from the recovery unit flows into the second inflow port through the second introducing member.

10. The liquid discharge apparatus according to claim 9, wherein the waste liquid of the pigment ink discharged from the printing unit to an outside of the sheet flows into the third inflow port.

11. The liquid discharge apparatus according to claim 10, wherein the waste liquid tank is detachably attached to the liquid discharge apparatus, and the first inflow port and each of the second inflow port and the third inflow port are spaced apart from each other in a direction crossing an attachment/detachment direction of the waste liquid tank.

12. A waste liquid tank configured for detachable attachment to a liquid discharge apparatus, the liquid discharge apparatus including a discharging unit configured to discharge a liquid onto a medium and first and second and third introducing members, the waste liquid tank comprising:

a storage part configured to store a waste liquid which is not discharged onto the medium by the discharging unit;

a first inflow port from which the waste liquid flows into the storage part;

a second inflow port from which the waste liquid flows into the storage part;

a third inflow port from which the waste liquid flows into the storage part; and a partition wall which forms a flow passage of the waste liquid by partitioning the storage part, wherein the first inflow port is configured for detachable attachment to the first introducing member, and is configured to be separated from the first introducing member by a detachment of the waste liquid tank from the liquid discharge apparatus, wherein the second inflow port is configured for detachable attachment to the second introducing member, and is configured to be separated from the second introducing member by the detachment of the waste liquid tank from the liquid discharge apparatus, wherein the third inflow port is configured for detachable attachment to the third introducing member, and is configured to be separated from the third introducing member by the detachment of the waste liquid tank from the liquid discharge apparatus, and wherein a position of the third inflow port in the flow passage is closer to the second inflow port than the first inflow port.

* * * * *